(12) United States Patent
Masuda

(10) Patent No.: US 10,576,952 B2
(45) Date of Patent: Mar. 3, 2020

(54) ELECTRIC BRAKE SYSTEM

(71) Applicant: NTN CORPORATION, Osaka-shi, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/457,120

(22) Filed: Mar. 13, 2017

(65) Prior Publication Data

US 2017/0182984 A1 Jun. 29, 2017

Related U.S. Application Data

(63) Continuation of application No. PCT/JP2015/075987, filed on Sep. 14, 2015.

(30) Foreign Application Priority Data

Sep. 25, 2014 (JP) .................................. 2014-195093
Sep. 7, 2015 (JP) .................................. 2015-175334

(51) Int. Cl.
*B60T 8/1755* (2006.01)
*F16D 65/18* (2006.01)
(Continued)

(52) U.S. Cl.
CPC ........ *B60T 8/17551* (2013.01); *B60T 8/1755* (2013.01); *B60T 8/885* (2013.01);
(Continued)

(58) Field of Classification Search
CPC ... B60T 8/88; B60T 8/885; B60T 8/90; B60T 8/92; B60T 8/94; B60T 8/96;
(Continued)

(56) References Cited

U.S. PATENT DOCUMENTS 5,551,771 A * 9/1996 Akuzawa ............... B60T 8/1764
303/186
5,795,039 A * 8/1998 Fennel .................. B60T 8/1764
303/122.05
(Continued)

FOREIGN PATENT DOCUMENTS

CN 1198389 A 11/1998
DE 10 2005 036 827 A1 2/2007
(Continued)

OTHER PUBLICATIONS

Line et al., "Electromechanical Brake Modeling and Control: From PI to MPC," May 2008, IEEE.*
(Continued)

*Primary Examiner* — Thomas G Black
*Assistant Examiner* — Sara J Lewandroski

(57) ABSTRACT

Provided is an electric brake system capable of compensating for a braking force by the whole electric brake system when functional degradation occurs in a part of the system. This system includes: a diagnosis module (24) that detects functional degradation in each of electric brake devices (DB); a control calculation module (23) that estimates a controlled variable error that is a difference between an estimate of a braking force determined by a braking force estimation device (28) of an electric brake device (DB) in which functional degradation is detected, and a braking force determined by the device (28) of an electric brake device (DB) in which no functional degradation is detected; and a controlled variable compensating module (29) that, when the module (23) estimates the existence of the error, distributes a braking force corresponding to the error among the devices (DB) other than the electric brake device in which the error exists so as to add the distributed braking
(Continued)

force to the braking force target value of each electric brake device.

6 Claims, 6 Drawing Sheets

(51) Int. Cl.
| | | |
|---|---|---|
| *B60T 17/22* | (2006.01) | |
| *B60T 13/74* | (2006.01) | |
| *B60T 17/18* | (2006.01) | |
| *B60T 8/88* | (2006.01) | |
| *F16D 121/24* | (2012.01) | |
| *F16D 125/40* | (2012.01) | |
| *F16D 125/48* | (2012.01) | |
| *F16D 127/06* | (2012.01) | |

(52) U.S. Cl.
CPC ............ *B60T 13/741* (2013.01); *B60T 17/18* (2013.01); *B60T 17/22* (2013.01); *F16D 65/18* (2013.01); *F16D 65/183* (2013.01); *B60T 2270/414* (2013.01); *F16D 2121/24* (2013.01); *F16D 2125/40* (2013.01); *F16D 2125/48* (2013.01); *F16D 2127/06* (2013.01)

(58) Field of Classification Search
CPC .. B60T 8/1881; B60T 17/221; B60T 2270/40; B60T 2270/402; B60T 2270/403; B60T 2270/404; B60T 2270/406; B60T 2270/408; B60T 2270/411; B60T 2270/413; B60T 2270/414; B60T 2270/415; B60T 2270/416; B60T 8/00; B60T 8/17; B60T 8/171; B60T 8/172; B60T 8/1755; B60T 8/17551; B60T 8/17554; B60T 8/18; B60T 17/18; B60T 17/22
See application file for complete search history.

(56) References Cited

U.S. PATENT DOCUMENTS

| | | | | |
|---|---|---|---|---|
| 6,062,657 | A * | 5/2000 | Dimasi | B60T 13/586 303/122.13 |
| 6,132,016 | A | 10/2000 | Salamat et al. | |
| 6,299,262 | B1 | 10/2001 | Salamat et al. | |
| 6,318,819 | B1 * | 11/2001 | Bohm | B60T 8/885 303/122 |
| 6,345,872 | B2 | 2/2002 | Salamat et al. | |
| 6,453,226 | B1 * | 9/2002 | Hac | B60T 8/1755 180/41 |
| 6,527,350 | B2 | 3/2003 | Salamat et al. | |
| 6,571,163 | B1 * | 5/2003 | Heckmann | B60T 13/662 318/108 |
| 6,655,755 | B2 | 12/2003 | Salamat et al. | |
| 6,722,745 | B2 | 4/2004 | Salamat et al. | |
| 6,749,269 | B1 | 6/2004 | Niwa | |
| 6,916,075 | B2 | 7/2005 | Salamat et al. | |
| 7,810,616 | B2 | 10/2010 | Nakazeki | |
| 7,850,255 | B2 | 12/2010 | Kawahara et al. | |
| 8,958,966 | B2 | 2/2015 | Nohira et al. | |
| 2001/0035681 | A1 | 11/2001 | Salamat et al. | |
| 2002/0014800 | A1 | 2/2002 | Salamat et al. | |
| 2002/0072836 | A1 * | 6/2002 | Weiberle | B60T 7/042 701/29.7 |
| 2002/0105226 | A1 | 8/2002 | Salamat et al. | |
| 2002/0109403 | A1 * | 8/2002 | Yamamoto | B60T 8/00 303/146 |
| 2003/0020326 | A1 | 1/2003 | Salamat et al. | |
| 2004/0162650 | A1 * | 8/2004 | Kueperkoch | B60G 17/0185 701/29.2 |
| 2004/0189084 | A1 | 9/2004 | Salamat et al. | |
| 2005/0057095 | A1 * | 3/2005 | Hac | B60T 8/1755 303/122 |
| 2007/0114843 | A1 * | 5/2007 | Kawahara | B60T 7/12 303/122 |
| 2007/0255475 | A1 * | 11/2007 | Dagh | B60T 8/00 701/71 |
| 2008/0054718 | A1 | 3/2008 | Nishino et al. | |
| 2008/0110704 | A1 | 5/2008 | Nakazeki | |
| 2008/0154470 | A1 * | 6/2008 | Goranson | B60T 7/042 701/70 |
| 2008/0284358 | A1 * | 11/2008 | Ralea | B60T 8/1703 318/14 |
| 2010/0114444 | A1 * | 5/2010 | Verhagen | B60T 7/042 701/70 |
| 2011/0031804 | A1 * | 2/2011 | Shimada | B60T 8/266 303/2 |
| 2011/0226569 | A1 * | 9/2011 | Devlieg | B60T 8/1703 188/158 |
| 2012/0055744 | A1 * | 3/2012 | Chen | B60T 8/267 188/106 P |
| 2013/0270895 | A1 * | 10/2013 | Nishioka | B60T 7/042 303/14 |
| 2013/0304314 | A1 * | 11/2013 | Udaka | B60T 8/17616 701/34.4 |
| 2014/0015310 | A1 * | 1/2014 | Hanzawa | B60T 7/12 303/3 |
| 2014/0020378 | A1 * | 1/2014 | Hotani | B60T 13/745 60/545 |
| 2014/0200784 | A1 * | 7/2014 | Nohira | B60T 8/885 701/70 |
| 2015/0112568 | A1 * | 4/2015 | Hirota | B60T 8/1755 701/72 |
| 2016/0167631 | A1 * | 6/2016 | Miyazaki | B60T 7/042 701/70 |
| 2016/0318509 | A1 * | 11/2016 | Rycroft | B60T 8/1755 |

FOREIGN PATENT DOCUMENTS

| | | |
|---|---|---|
| EP | 1 026 060 A2 | 8/2000 |
| JP | 6-327190 | 11/1994 |
| JP | 11-171006 | 6/1999 |
| JP | 2000-225935 | 8/2000 |
| JP | 2006-194356 | 7/2006 |
| JP | 2007-137182 | 6/2007 |
| JP | 2008-56074 | 3/2008 |
| JP | 2013-75544 | 4/2013 |
| JP | 2013-525168 | 6/2013 |
| WO | WO 2011/116202 A2 | 9/2011 |

OTHER PUBLICATIONS

Line et al., "Electromechanical Brake Modeling and Control: From PI to MPC," May 2008, IEEE (Year: 2008).*
International Preliminary Report on Patentability dated Apr. 6, 2017 in corresponding International Patent Application No. PCT/JP2015/075987.
International Search Report dated Dec. 8, 2015 in corresponding International Application No. PCT/JP2015/075987.
Extended European Search Report dated May 4, 2018, in corresponding European Patent Application No. 15844226.9, 7 pgs.
Chinese Office Action dated Sep. 28, 2018 in corresponding Chinese Patent Application No. 201580051363.0 (4 pages).
Chinese Search Report dated Sep. 19, 2018 in corresponding Chinese Patent Application No. 201580051363.0 (3 pages).
Japanese Office Action dated Jun. 11, 2019 in corresponding Japanese Patent Application No. 2015-175334 (6 pages).

* cited by examiner

ELECTRIC BRAKE SYSTEM

CROSS REFERENCE TO THE RELATED APPLICATION

This application is a continuation application, under 35 U.S.C. § 111(a), of international application No. PCT/JP2015/075987, filed Sep. 14, 2015, which claims Convention priority to Japanese patent application No. 2014-195093, filed Sep. 25, 2014, and Japanese patent application No. 2015-175334, filed Sep. 7, 2015, the entire disclosures of which are herein incorporated by reference as a part of this application.

BACKGROUND OF THE INVENTION

Field of the Invention

The present invention relates to an electric brake system, and to a technique of compensating for a braking force by the whole electric brake system when functional degradation occurs in a part of the electric brake system.

Description of Related Art

Regarding electric brake devices, the following techniques have been proposed.

1. An electric linear motion actuator in which a planetary roller screw mechanism is used (Patent Document 1).

2. A technique of converting rotary motion of a motor into linear motion through a linear motion mechanism, which brings a brake pad into pressure contact with a brake disc, when a brake pedal is depressed on, thereby applying a braking force (Patent Document 2).

RELATED DOCUMENT

Patent Document

[Patent Document 1] JP Laid-open Patent Publication No. 2006-194356

[Patent Document 2] JP Laid-open Patent Publication No. H6-327190

SUMMARY OF THE INVENTION

In the electric brake device as described in Patent Document 1 or 2, functional degradation may be caused by abnormality of a mechanical component of an electric actuator, abnormality of a power supply system, or the like. In this case, a desired braking force cannot be generated.

It is an object of the present invention to provide an electric brake system capable of compensating for a braking force by the whole electric brake system when functional degradation occurs in a part of the electric brake system.

Hereinafter, for convenience of easy understanding, a description will be given with reference to the reference numerals in embodiments.

An electric brake system according to one aspect of the present invention is an electric brake system including a plurality of electric brake devices DB, in which each electric brake device DB includes: a brake rotor 8; a friction member 9 configured to operatively contact the brake rotor 8; a friction member actuator 6 configured to cause the friction member 9 to contact the brake rotor 8; an electric motor 4 configured to drive the friction member actuator 6; a braking force estimation device 28 configured to determine an estimate of a braking force generated by the friction member 9 being pressed against the brake rotor 8; and a control device 2 configured to perform follow-up control of the generated braking force by controlling the electric motor 4 so that the generated braking force matches a braking force target value. The electric brake system further includes: a controlled variable error estimation module 23 configured to estimate, for each electric brake device DB, a controlled variable error that is a difference between the estimate of the braking force determined by the braking force estimation device 28, and a braking force produced by the brake device having no functional degradation; and a controlled variable compensating module 29 configured to, when the controlled variable error estimation module 23 estimates the existence of the controlled variable error, distribute a braking force corresponding to the controlled variable error among the electric brake devices other than the electric brake device in which the existence of the controlled variable error is estimated so as to be added to the braking force target values of the respective electric brake devices DB.

The "friction member" may include a brake lining, a brake pad, and the like.

The functional degradation may be occurrence of abnormality in a mechanical component such as a bearing of any electric brake device DB, occurrence of abnormality in a power supply system of any electric brake device DB, or the like.

According to this configuration, when the controlled variable error estimation module 23 estimates the existence of the controlled variable error, the controlled variable compensating module 29 distributes a braking force corresponding to the controlled variable error among the electric brake devices other than the electric brake device in which the existence of the controlled variable error is estimated, that is, the normal electric brake devices DB, so as to add the distributed braking force to the braking force target value of each electric brake device.

By detecting functional degradation in any electric brake device DB and distributing the braking force corresponding to the controlled variable error among the braking force target values of the normal electric brake devices DB so as to be added, the braking force that is not applied due to the functional degradation can be compensated for by the whole electric brake system. Therefore, even when functional degradation occurs in a part of the electric brake system, it is possible to generate a desired braking force as the whole vehicle.

The electric brake system may further include a plurality of diagnosis module configured to detect functional degradations of the respective electric brake devices, and the controlled variable error estimation module may estimate a difference between an estimate of a braking force determined by the braking force estimation device of an electric brake device in which functional degradation is detected by the diagnosis module, and an estimate of a braking force determined by the braking force estimation device of an electric brake device in which no functional degradation is detected by the diagnosis module.

In order to determine the braking force in the case where no functional degradation occurs, the controlled variable error estimation module 23 may use a state transition formula Md expressing relationships among: a state variable including a motor rotation angle of the electric motor; a manipulated variable including voltage or current of the electric motor 4; a state transition matrix including electric actuator inertia of an electric actuator that includes the electric motor 4 and the friction member actuator 6; and a controlled variable including a braking force.

In this case the controlled variable error can be obtained with high accuracy.

The electric brake system may further include: a main power supply device 3 configured to supply power to each of the control devices 2 of the plurality of electric brake devices and to each of the electric motors 4 of the plurality of electric brake devices; and a backup power supply device 22 used when the main power supply device 3 is in an abnormal state. The diagnosis module 24 may include a power supply diagnosis section configured to determine whether or not supply of power from the main power supply device 3 is abnormal. The electric brake system may further include a power supply switching mechanism 21 configured to perform switching of power supply to the backup power supply device 22 when the power supply diagnosis section has determined that supply of power from the main power supply device 3 is abnormal.

The backup power supply device 22 may be, for example, a small-size battery, a capacitor, or the like.

According to this configuration, in the normal state, the main power supply device 3 supplies power to the control device 2 and the electric motor 4. When the diagnosis module 24 has determined that supply of power from the main power supply device 3 is abnormal due to, for example, breakage of a power supply harness or the like, the power supply switching mechanism 21 performs switching of power supply from the main power supply device 3 to the backup power supply device 22. Therefore, redundancy of the whole electric brake system can be achieved.

The electric brake system may further include a power limitation unit 32 configured to limit the power supplied to the electric motor 4, when the power supply switching mechanism 21 performs switching of power supply from the main power supply device 3 to the backup power supply device 22. The controlled variable error estimation module 23 may estimate a controlled variable error that is a difference between an estimate of a braking force determined by the braking force estimation device 28 of an electric brake device DB subjected to power limitation by the power limitation unit 32 and an estimate of a braking force determined by the braking force estimation device 28 of an electric brake device DB not subjected to power limitation by the power limitation unit 32.

In this case, the power limitation unit 32 limits the power supplied to the electric motor 4, when switching of power supply is performed from the main power supply device 3 to the backup power supply device 22, whereby redundancy of the whole electric brake system can be achieved. Further, power consumption can be reduced, and power efficiency of the vehicle can be improved. Thus, the controlled variable error estimation module 23 estimates a controlled variable error as a difference between the braking force produced by an electric brake device DB subjected to power limitation and the braking force produced by an electric brake device DB not subjected to power limitation while achieving redundancy and improvement of power efficiency, whereby precise control can be performed.

The electric brake system may further include a yaw moment calculation module 36 configured to determine a yaw moment that occurs in a vehicle equipped with the electric brake system. When the controlled variable compensating module 29 adds the distributed braking force corresponding to the controlled variable error to the braking force target value, the controlled variable compensating module 29 may determine the braking force to be added so that a yaw moment detected by the yaw moment calculation module 36 becomes smaller than or equal to a predetermined value.

The predetermined value is determined on the basis of the result of test, simulation, or the like.

In this case, even when functional degradation occurs in a part of the electric brake system, the braking force corresponding to the functional degradation can be compensated for by the whole electric brake system, and moreover, traveling stability of the vehicle can be improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

An electric brake system according to a first embodiment will be described with reference to FIG. 1 to FIG. 6.

Figure 1:
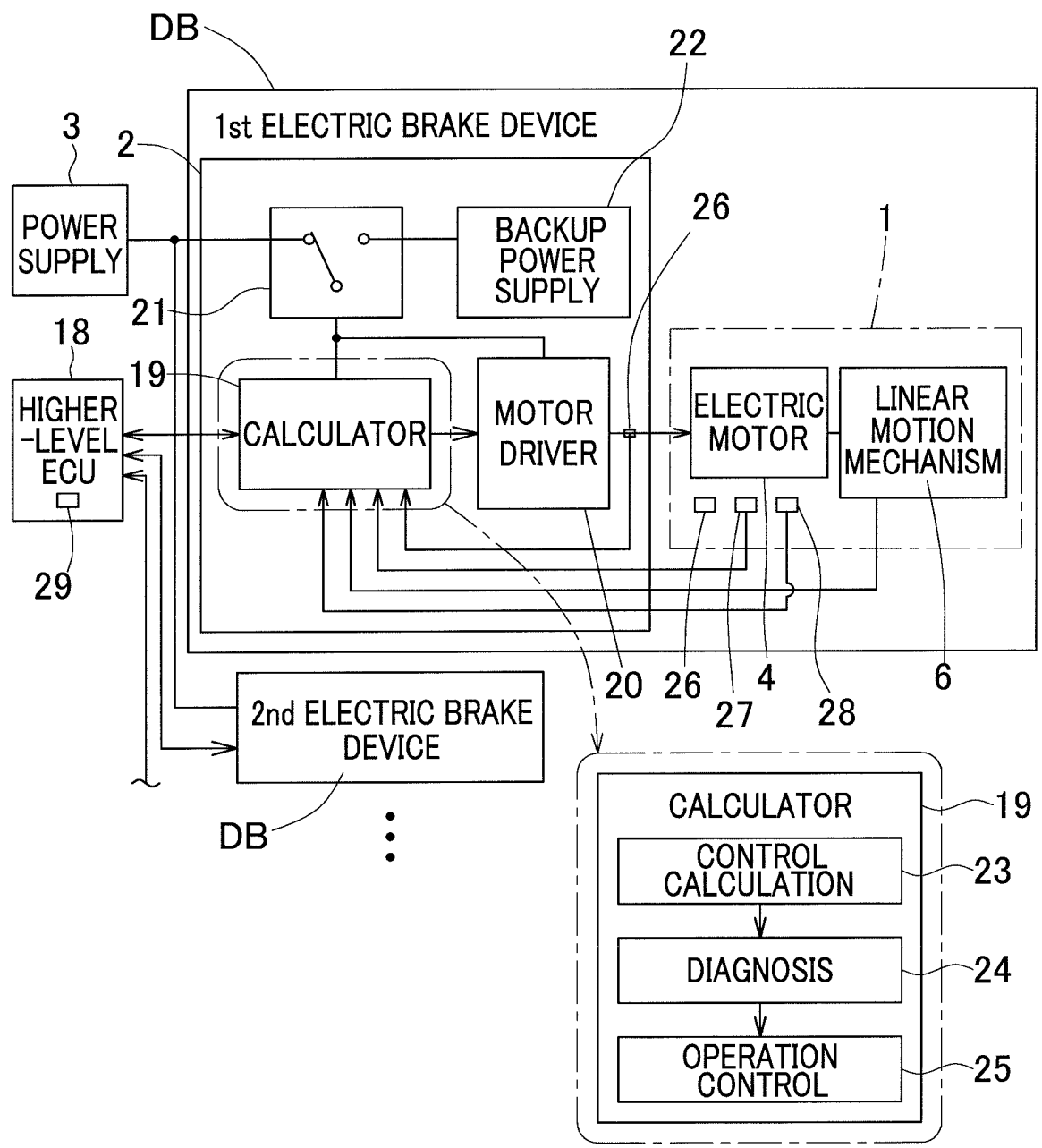
FIG. 1 is a block diagram schematically showing an electric brake system according to a first embodiment.

As shown in FIG. 1, the electric brake system includes a plurality of electric brake devices DB, a power supply device 3, and a host or higher-level ECU 18. Each electric brake device DB includes an electric actuator 1 and a control device 2. First, the electric actuator 1 will be described.

Figure 2:
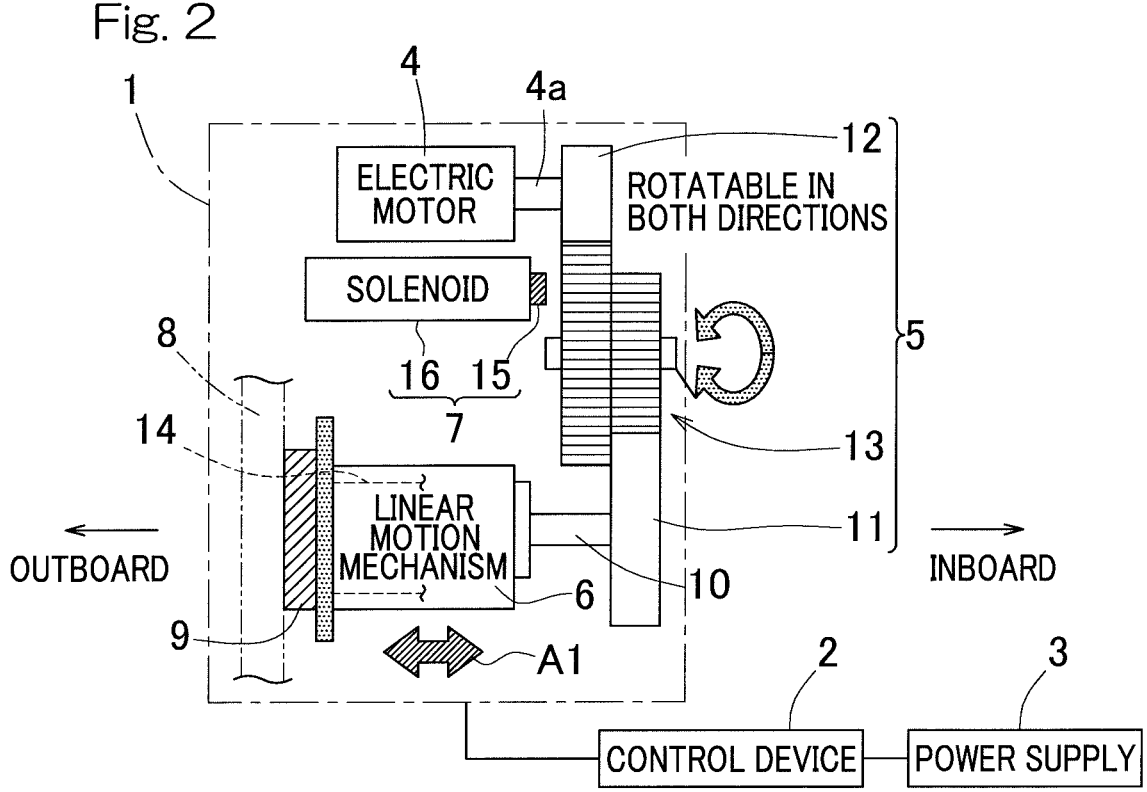
FIG. 2 is a diagram schematically showing an electric brake device included in the electric brake system shown in FIG. 1.

As shown in FIG. 2, the electric actuator 1 includes an electric motor 4, a speed reduction mechanism 5 that reduces the speed of rotation of the electric motor 4, a linear motion mechanism (conversion mechanism) 6, a parking brake mechanism 7 as a parking brake, a brake rotor 8, and a brake lining 9, which functions as a friction member and includes a brake pad. The electric motor 4, the speed reduction mechanism 5, and the linear motion mechanism 6 are incorporated in, for example, a housing (not shown) or the like.

The electric motor 4 may include a three-phase synchronous motor. The speed reduction mechanism 5 is configured to reduce the speed of rotation of the electric motor 4 and transmit the rotation to a tertiary gear 11 fixed to a rotation shaft 10. The speed reduction mechanism 5 includes a primary gear 12, an intermediate gear 13, and the tertiary gear 11. In this example, the speed reduction mechanism 5 reduces, by the intermediate gear 13, the speed of rotation of the primary gear 12 mounted to a rotor shaft 4a of the electric motor 4, and allows the rotation to be transmitted to the tertiary gear 11 fixed to an end portion of the rotation shaft 10.

The linear motion mechanism 6 serving as brake lining operation mechanism (friction member operation mechanism) is configure to convert, by a feed screw mechanism, rotary motion outputted from the speed reduction mechanism 5 into linear motion of a linear motion portion 14, and bring the brake lining 9 into contact with the brake rotor 8 or separates the brake lining 9 from the brake rotor 8. The linear motion portion 14 is supported so as to be prevented from rotating and be movable in an axial direction indicated by an arrow A1. The brake lining 9 is provided on an outboard end of the linear motion portion 14. When rotation of the electric motor 4 is transmitted to the linear motion mechanism 6 through the speed reduction mechanism 5, rotary motion is converted into linear motion, which is then converted into a pressing force of the brake lining 9, a braking force is generated. The term "outboard" means, in a state where the electric brake device DB is mounted to a vehicle, the outer side of the vehicle. And the center side of the vehicle is referred to as "inboard".

Figure 3:
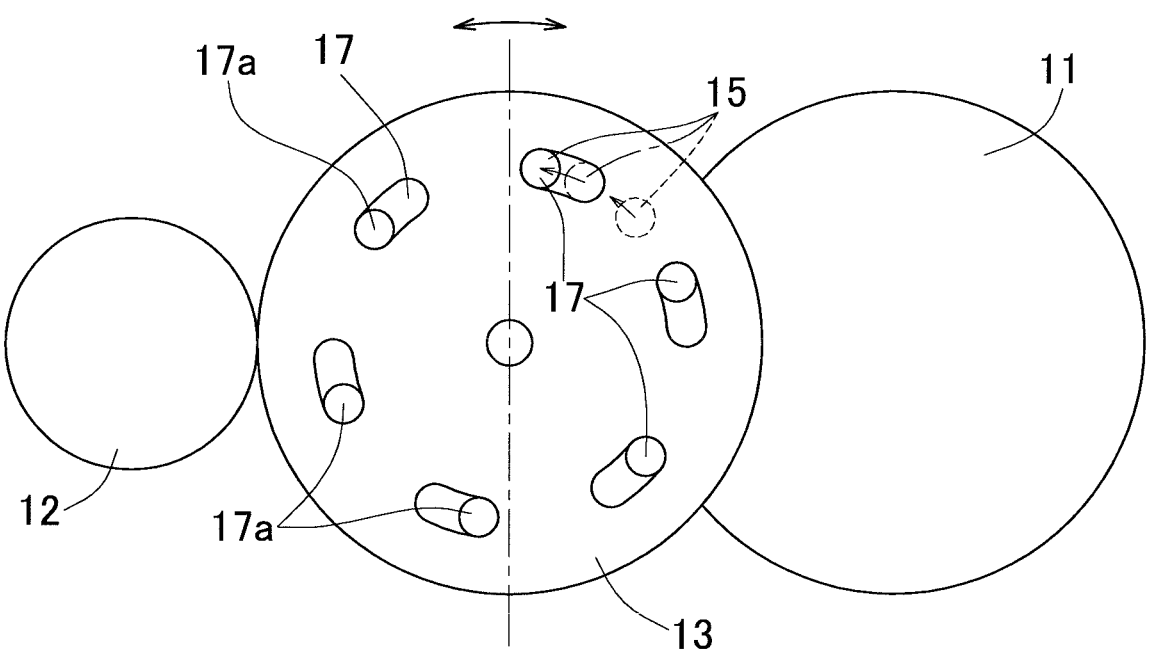
FIG. 3 is a plan view schematically showing a parking brake mechanism of the electric brake device shown in FIG. 2.

FIG. 3 is a plan view schematically showing the parking brake mechanism. On an outboard end surface of the intermediate gear 13, a plurality of (six in this example) locking holes 17 are arranged at equal intervals in the circumferential direction. Each locking hole 17 is formed in an elongated hole shape extending in the circumferential direction. A locking member 15 is engageable with any one of the locking holes 17.

For example, a linear solenoid is adopted as a parking brake actuator 16 (FIG. 2). The locking member (solenoid pin) 15 is advanced by the parking brake actuator 16 (FIG. 2) and fitted into a bottomed cylindrical hole portion 17a of the locking hole 17, which is formed in the intermediate gear 13, so as to be engaged with the locking hole 17, thereby preventing the intermediate gear 13 to rotate. Thus, the parking brake mechanism enters a parking lock state. A part or the whole of the locking member 15 is retracted by the parking brake actuator 16 (FIG. 2) to be disengaged from the locking hole 17, thereby allowing the intermediate gear 13 to rotate. Thus, the parking brake mechanism enters an unlock state.

As shown in FIG. 1, to the control devices 2 of the respective electric brake devices DB, one main power supply device 3, which supplies power to the control devices 2 and the electric motors 4, and one host ECU 18 as a higher-level control module for control devices 2 are connected. For example, an electric control unit that performs general control of the vehicle is adopted as the host ECU 18. The host ECU 18, for example, outputs braking force target values to the respective control devices 2 in response to an output from a sensor (not shown) that varies according to a manipulated variable of a brake pedal (not shown). The distribution ratio of the braking force target values to the respective electric brake devices DB may be, for example, a fixed value, or a variable value based on motion and/or attitude of the vehicle that are estimated from information from on-vehicle sensors such as an acceleration sensor and specifications of the vehicle equipped with the electric brake devices DB.

Each control device 2 includes a calculator 19, a motor driver 20, a power supply switching mechanism 21, and a backup power supply device 22. The calculator 19 includes: a control calculation module 23 that controls the braking force produced by the electric brake device DB so as to follow the braking force target value, on the basis of sensing information of the electric actuator 1 and information such as the braking force target value; a diagnosis module 24 that detects, from the above information, functional degradation of the electric brake device DB; and an operation control module 25 that controls operations of associated switches, the motor driver 20, etc. The calculator 19 may be composed of a processor such as a microcomputer, or may be composed of a hardware module such as an ASIC. That is, the control calculation module 23, the diagnosis module 24, and the operation control module 25 are implemented by executing, by a processor, a software program that performs later-described processing, or by executing the processing by a hardware module.

Examples of the sensing information of the electric motor 4 in the electric actuator 1 may include a motor current value detected by a detection device (means for detecting a current or the like) 26, and a motor angle estimated by a rotation angle estimation device 27. The detection device 26 may be, for example, a current sensor, or may estimate a motor current value from motor specifications such as previously measured inductance value, resistance value, and the like, and a motor voltage. The rotation angle estimation device 27 may be, for example, an angle sensor such as a magnetic encoder or a resolver, or may estimate a motor angle from the motor specifications and the motor voltage by using physical equations.

The braking force produced by the electric brake device DB is estimated by a braking force estimation device 28. The braking force estimation device 28 estimates a braking force that is actually generated, on the basis of a detection value obtained by sensing influence on the electric brake device DB itself or the associated wheel, which influence is caused by the operation of the electric brake device DB. In particular, even when functional degradation occurs in the electric brake device DB, the brake estimation device 28 can estimate a braking force that is generated in the state where the functional degradation occurs. The braking force estimation device 28 may be composed of, for example, a load sensor that detects a load on the electric actuator 1. Alternatively, the braking force estimation device 28 may estimate a braking force on the basis of information from a wheel speed sensor, an acceleration sensor, or the like of the vehicle equipped with the electric brake system. Further alternative embodiment, the braking force estimation device 28 may estimate a braking force on the basis of the characteristics of the electric actuator 1 and the above-mentioned sensing information of the electric motor 4.

For example, the load sensor may include a magnetic sensor. As shown in FIG. 2, when the brake lining 9 presses the brake rotor 8, a counterforce toward the inboard acts on the linear motion portion 14. The load sensor composed of a magnetic sensor magnetically detects the counterforce of the braking force, as a displacement in the axial direction. As shown in FIG. 1, by setting in advance the relationship between the counterforce of the braking force and the sensor output through an experiment or the like, the braking force estimation device 28 can estimate a braking force on the basis of the sensor output from the load sensor. Instead of the magnetic sensor, the load sensor may include an optical, eddy current type, or capacitance type sensor.

The motor driver 20 converts a DC power from the main power supply device 3 into a three-phase AC power used for driving the electric motor 4. The motor driver 20 may be, for example, a half-bridge circuit including field effect transistors (FETs), snubber capacitors, etc.

The backup power supply device 22 is used when the main power supply device 3 is in an abnormal state. The backup power supply device 22 is, for example, a small-size battery, a capacitor, or the like. The diagnosis module 24 of the calculator 19 includes a power supply diagnosis section that determines whether or not supply of power from the main power supply device 3 is abnormal. The power supply diagnosis section determines not only abnormality of the power supply device itself but also abnormality such as breakage of a power supply harness extending from the main power supply device 3.

The power supply switching mechanism 21 is composed of, for example, a switching element, and performs switching of power supply to the backup power supply device 22 when it has been determined by the power supply diagnosis function of the diagnosis module 24 that supply of power from the main power supply device 3 is abnormal.

Figure 4:
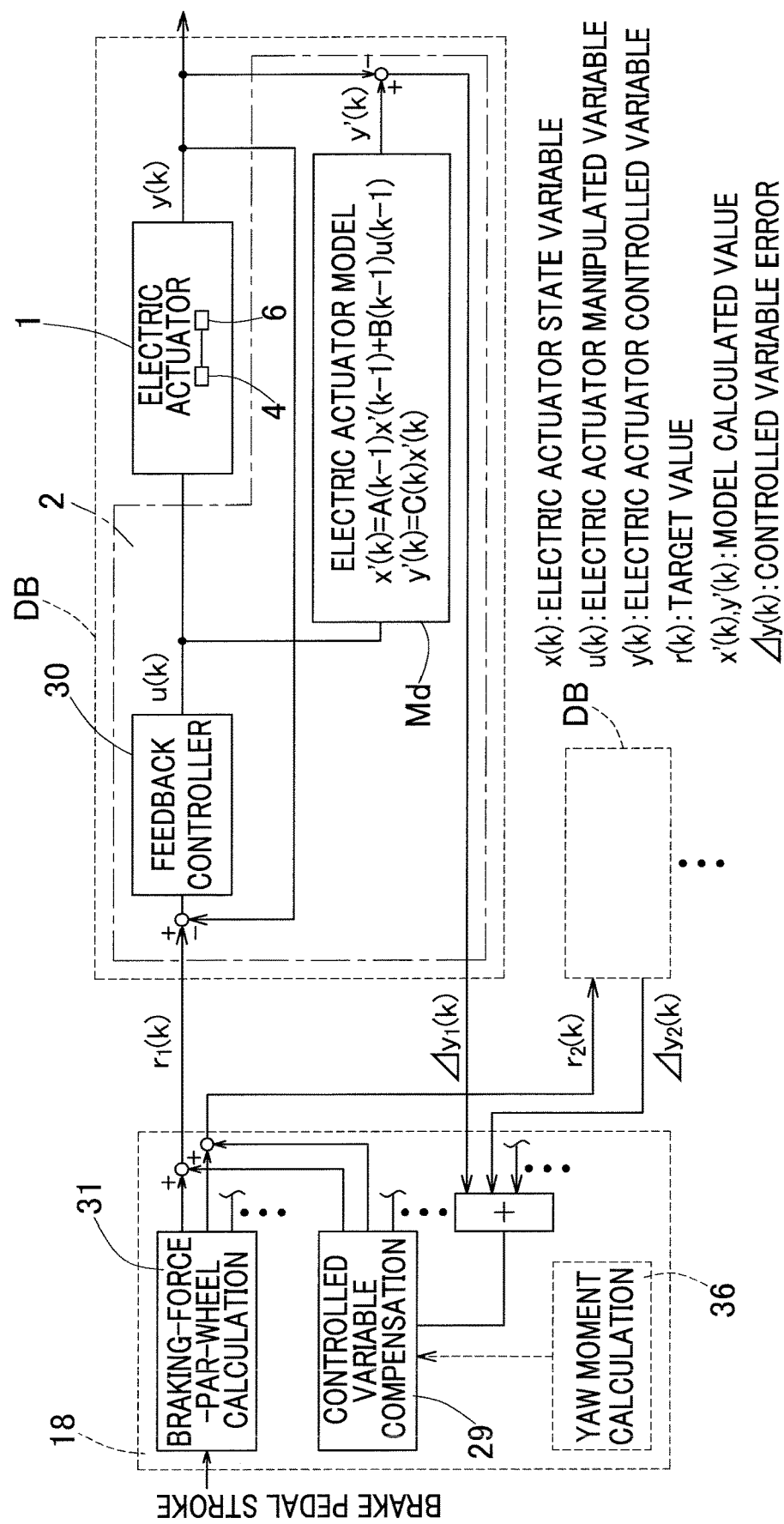
FIG. 4 is a block diagram showing a control system of the electric brake system shown in FIG. 1.

FIG. 4 is a block diagram showing an example of the electric brake system in which the host ECU 18 is provided with a controlled variable compensating module 29. The control calculation module 23 (FIG. 1) of the calculator 19 in each control device 2 executes follow-up control in which a feedback controller 30 feeds a braking force back to a braking force target value provided from the host ECU 18. While an example of a serial output feedback compensator is shown in this embodiment, state feedback control or nonlinear switching control may be used.

The control calculation module 23 (FIG. 1) of the calculator 19 also functions as a controlled variable error estimation module which outputs a difference between a braking force estimated by the braking force estimation device 28 and a result of calculation according to a state transition model Md (state transition formula), that is, outputs a controlled variable error, as $\Delta y$. Thus, the controlled variable error is a difference between a braking force produced by an electric brake device DB in which functional degradation has been detected by the diagnosis module 24 (FIG. 1), that is, a braking force estimated by the brake estimation device, and a braking force produced by the electric brake device DB in which no functional degradation is detected.

When functional degradation occurs in the electric brake device DB, the diagnosis module 24 (FIG. 1) of the calculator 19 detects the functional degradation in a manner as described later. At this time, there is a risk that a controlled variable error $\Delta y$ may occur due to influence within a minute error range of, for example, a dimensional tolerance, assembling accuracy, or the like of the linear motion mechanism 6 and/or the electric motor 4. The diagnosis module 24 (FIG. 1) may use a dead band, a filter, or the like to eliminate influence within such an error range.

The control calculation module 23 (FIG. 1), as the controlled variable error estimation module, uses the state transition model Md, which is expressed with: model calculation value x'(k) of a state variable x(k) including a motor rotation angle of the electric motor 4; a manipulated variable u(k) including voltage or current of the electric motor 4; a state transition matrix A including electric actuator inertia of the electric actuator including the electric motor 4 and the linear motion mechanism 6; and a controlled variable y(k) including a braking force. The state transition model Md is expressed as follows:

$$x'(k)=A(k-1)x'(k-1)+B(k-1)u(k-1)$$

$$y'(k)=C(k)x'(k)$$

The host ECU 18 includes: a braking-force-par-wheel calculation section 31 that calculates a braking force target value to be distributed to each electric brake device DB; and the controlled variable compensating module 29. When the controlled variable error estimation module estimates that a controlled variable error $\Delta y$ occurs, the controlled variable compensating module 29 distributes a braking force corresponding to the controlled variable error $\Delta y$ among the electric brake devices DB other than the electric brake device DB in which the controlled variable error $\Delta y$ has occurred, to add the distributed braking force to the braking force target value of each electric brake device DB.

Specifically, the controlled variable compensating module 29 firstly checks a controlled variable error $\Delta y$ of each electric brake device DB. Then, the controlled variable compensating module 29 distributes and adds, to electric brake devices DB the controlled variable errors $\Delta y$ of which are smaller than a predetermined value, an additional value equal to the total sum of the controlled variable errors $\Delta y$ of the electric brake devices DB. The braking force target values may be equally distributed among the electric brake devices DB. The above predetermined value is determined on the basis of the result of a test, simulation, or the like.

Figure 5:
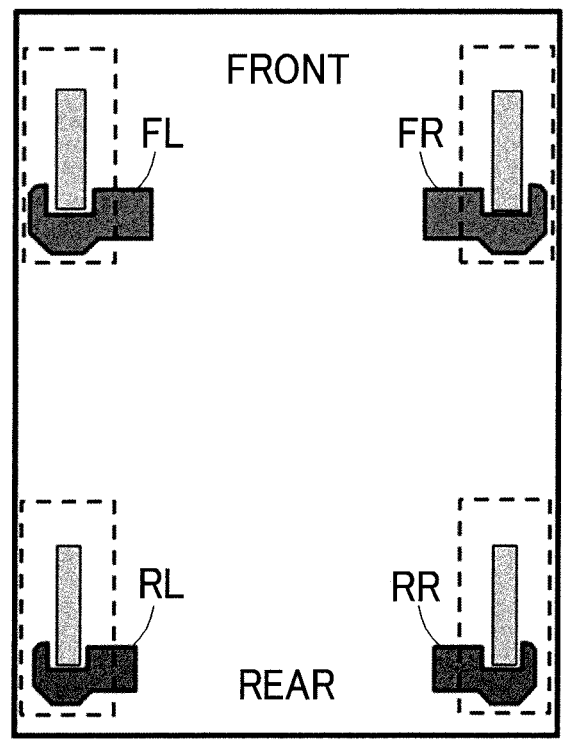
FIG. 5 is a plan view showing an electric brake system according to embodiments, in which a plurality of electric brake devices are mounted to a vehicle.
Figure 6:
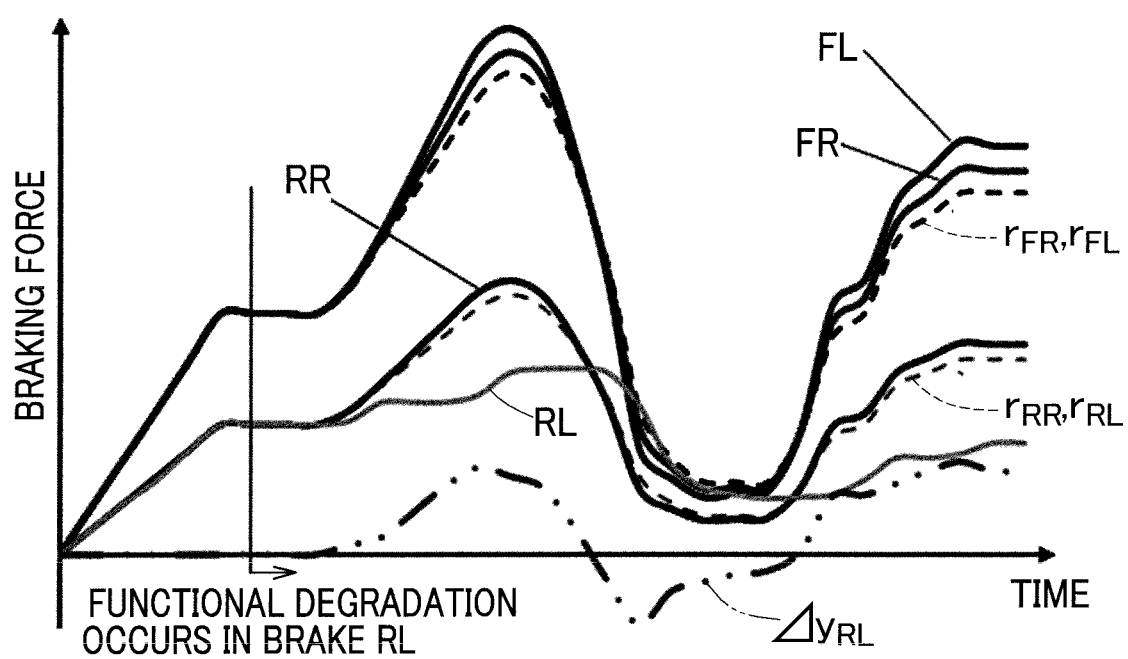
FIG. 6 is a graph showing the relationship between time and braking force in a case where functional degradation occurs in one of electric brake devices in the electric brake system shown in FIG. 1.

FIG. 5 is a plan view showing an electric brake system including a plurality of electric brake devices mounted to a vehicle. FIG. 6 shows the relationship between the time and the braking force in a case where functional degradation occurs in one of the electric brake devices in the electric brake system according to the present embodiment. FIG. 5 and FIG. 6 show an example of operation in which functional degradation occurs at a certain time in an electric brake device RL disposed at a left rear wheel of the vehicle, and thus the braking forces of electric brake devices FR, FL, RR, and RL disposed at a right front wheel, a left front wheel, a right rear wheel, and the left rear wheel do not follow braking force target values $r_{FR}$, $r_{FL}$, $r_{RR}$, and $r_{RL}$, respectively. In this case, the above-mentioned controlled variable compensating module 29 (FIG. 4) allows the electric brake devices FR, FL, and RR other than the electric brake device RL to be operated at braking forces greater than the respective braking force target values $r_{RF}$, $r_{FL}$, and $r_{RR}$ in order to compensate for a controlled variable error $\Delta y_{RL}$ that has occurred in the electric brake device RL at the left rear wheel.

According to the electric brake system described above, when functional degradation is detected in any electric brake device DB, a braking force corresponding to the controlled variable error is added to the braking force target values of normal electric brake devices DB, whereby the braking force corresponding to the functional degradation can be compensated for by the whole electric brake system. Therefore, even if functional degradation occurs in a part of the electric brake system, it is possible to generate a desired braking force.

In a normal state, the main power supply device 3 supplies power to the control device 2 and the electric motor 4. If the diagnosis module 24 has determined that supply of power from the main power supply device 3 is abnormal due to, for example, breakage of a power supply harness or the like, the power supply switching mechanism 21 performs switching of power supply from the main power supply device 3 to the backup power supply device 22. Thus, redundancy of the whole electric brake system can be achieved.

A second embodiment will be described.

In the following description, the components corresponding to the matters described in each of the preceding embodiments are denoted by like reference numerals, and repeated description is not given. When only a part of a configuration is described, the other part of the configuration is the same as described in the preceding description unless otherwise specified. The same operation and effect can be obtained from the same configuration. A combination of parts that are specifically described in the embodiments can be implemented, and, further, the embodiments may be partially combined unless such combinations cause any problem.

Figure 7:
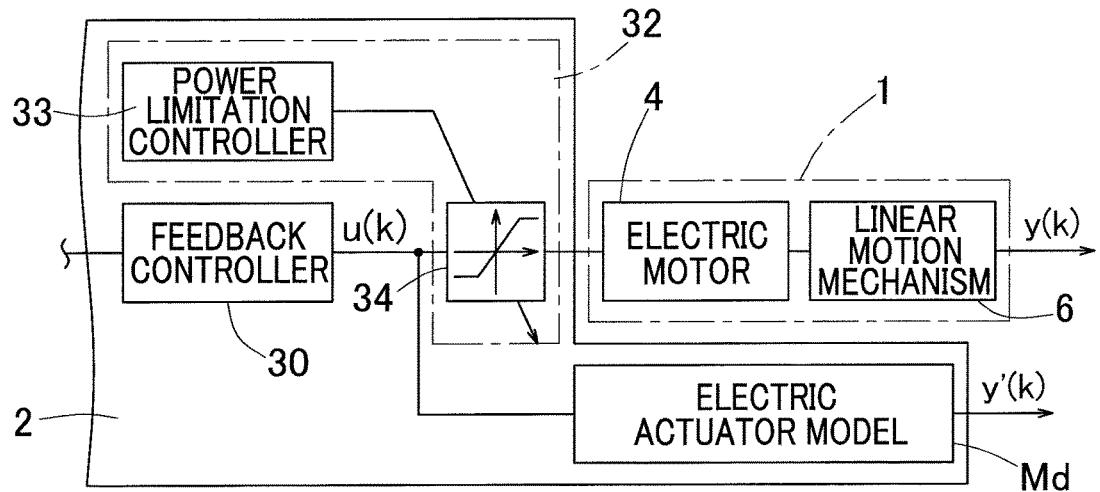
FIG. 7 is a block diagram showing a control block in an electric brake device of an electric brake system according to a second embodiment, showing a configuration in which power supplied to an electric motor is limited when switching to a backup power supply device is performed.

FIG. 7 is a block diagram showing an electric brake system according to the second embodiment. FIG. 7 shows a configuration to limit the power supplied to the electric motor when switching to the backup power supply device is performed. In this example, a power limitation unit 32 is provided, which limits the power supplied to the electric motor 4 when the power supply switching mechanism 21 (FIG. 1) performs switching of power supply from the main power supply device 3 (FIG. 1) to the backup power supply device 22 (FIG. 1).

The power limitation unit 32 is provided in the calculator 19 (FIG. 1). The power limitation unit 32 includes a power limitation controller 33 and a limiter circuit 34. The limiter circuit 34 can switch between an active state and a non-active state according to a signal from the power limitation controller 33, and is normally in the non-active state. When the diagnosis module 24 detects abnormality of the main power supply device 3 (FIG. 1) from, for example, a change in voltage of the main power supply device 3 (FIG. 1) and the power limitation controller 33 receives the result of the detection, the power limitation controller 33 sets the limiter circuit 34 in the active state, and reduces the output voltage to be lower than or equal to a set voltage. Thus, the power supplied to the electric motor 4 is limited. The power limitation controller 33 may receive, from the host ECU 18 (FIG. 1), information indicating that abnormality has occurred in the main power supply device 3 (FIG. 1).

In this case, the power limitation unit 32 limits the power supplied to the electric motor 4 when power supply is switched from the main power supply device 3 (FIG. 1) to the backup power supply device 22 (FIG. 1), whereby redundancy of the whole electric brake system can be achieved. Further, power consumption can be reduced, and power efficiency of the vehicle can be improved. As a result, redundancy and improved power efficiency are achieved. In addition, the controlled variable error estimation module estimates a controlled variable error which is a difference between the braking force produced by an electric brake device subjected to power limitation and the braking force produced by an electric brake device not subjected to power limitation, and therefore, precise control can be realized.

Figure 8:
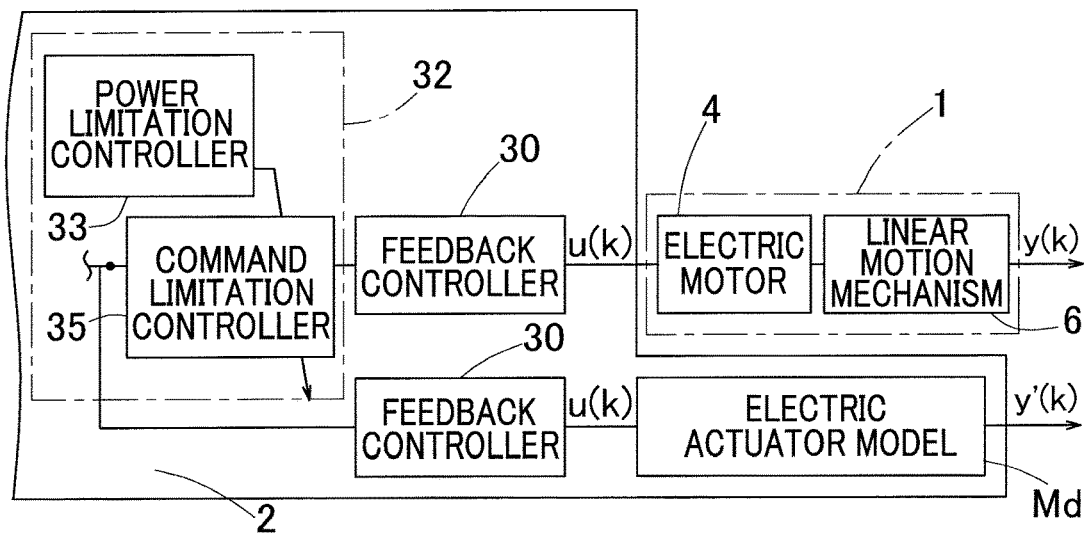
FIG. 8 is a block diagram showing a control block in an electric brake device of an electric brake system according to a third embodiment, showing a configuration to reduce power consumption.

FIG. 8 is a block diagram showing an electric brake system according to a third embodiment. FIG. 8 shows a configuration to reduce power consumption in the electric brake system. The power limitation unit 32 in this example includes a power limitation controller 33, and a command limitation controller 35. When the diagnosis module 24 detects abnormality of the main power supply device 3 (FIG. 1) and the power limitation controller 33 receives the result of the detection, the power limitation controller 33 causes the command limitation controller 35 to reduce the operating frequency of the electric brake device DB and/or perform operation limitation on a forward efficiency line. Thus, power consumption can be reduced. In addition, the same effect as that of the electric brake system according to the second embodiment shown in FIG. 7 can be achieved.

Figure 9:
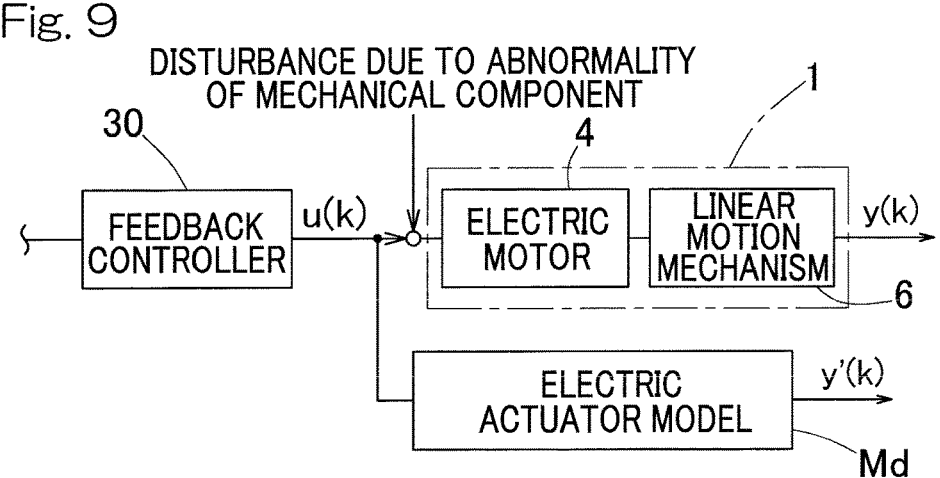
FIG. 9 is a block diagram showing a control block in an electric brake device included in an electric brake system according to a fourth embodiment, showing a configuration that deals with a case where functional degradation is caused by abnormality of a mechanical component in the electric brake device.

FIG. 9 is a block diagram showing an electric brake system according to a fourth embodiment. FIG. 9 is a block diagram showing the case where functional degradation occurs due to abnormality of a mechanical component in an electric brake device. Examples of the mechanical component include a bearing, a gear, and the like in the electric brake device. Abnormality of such a mechanical component increases a sliding resistance d, which causes a controlled variable error such as an error of a motor torque. Also when such a controlled variable error occurs, the controlled variable compensating module 29 (FIG. 4) adds the controlled variable error to the braking force target values of the normal electric brake devices. Therefore, the braking force corresponding to the functional degradation can be compensated for the whole electric brake system.

Figure 10:
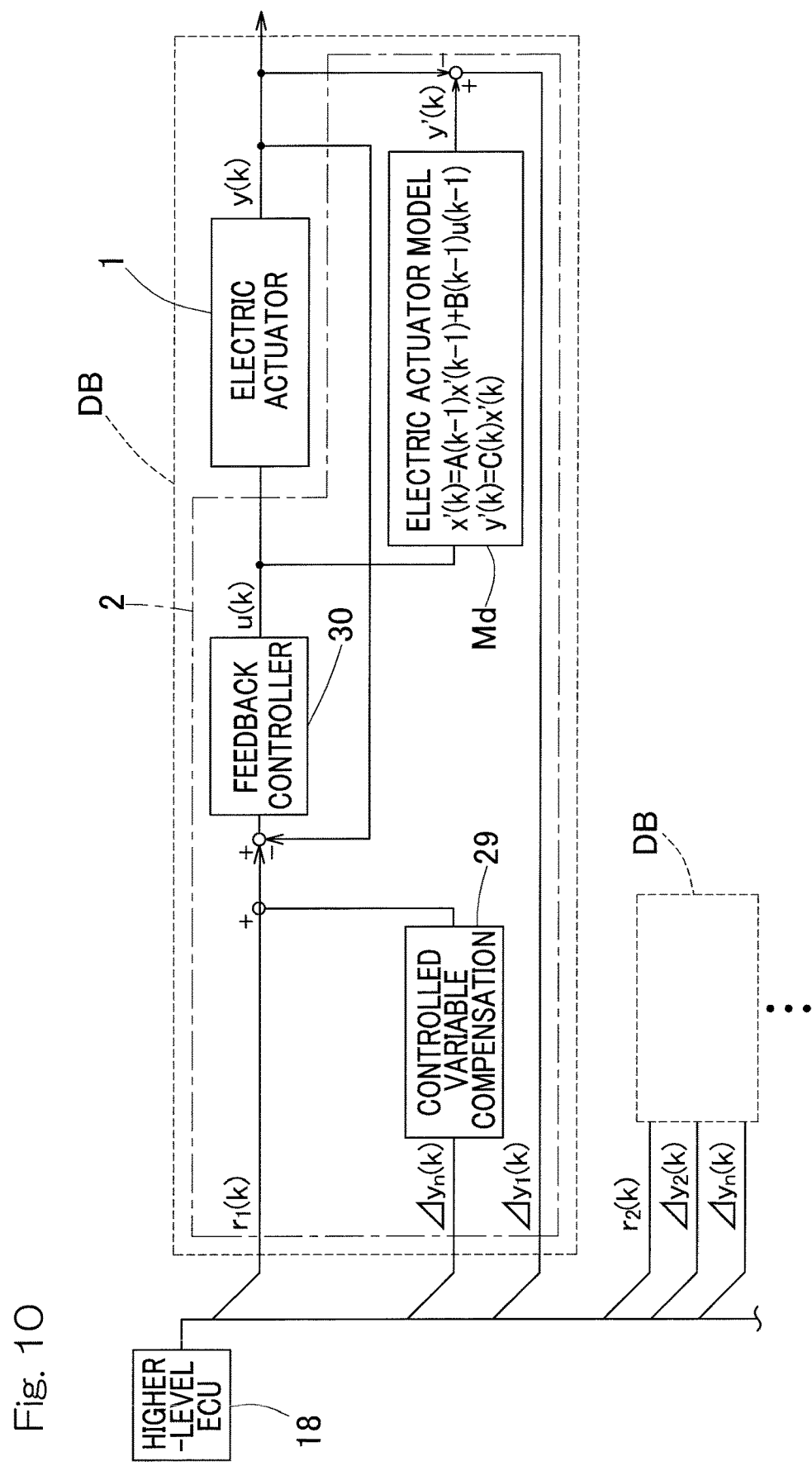
FIG. 10 is a block diagram showing a control system in an electric brake system according to a fifth embodiment.

While the host ECU 18 is provided with the controlled variable compensating module 29 in the example shown in FIG. 4, it is not limited to this example. For example, FIG. 10 shows an electric brake system according to a fifth embodiment, in which the control device 2 of each electric brake device DB is provided with a controlled variable compensating module 29A. According to this embodiment, the respective controlled variable compensating modules 29A cooperate with each other to calculate the total sum of the controlled variable errors Δy.

The vehicle, in which the electric brake devices are mounted to the four wheels, respectively, may be provided with a yaw moment calculation module 36 (FIG. 4) for obtaining a yaw moment that occurs in this vehicle. When the controlled variable compensating module 29 adds the braking force corresponding to the controlled variable error Δy to the braking force target values, the controlled variable compensating module 29 may determine the braking force to be added so that the yaw moment detected by the yaw moment calculation module 36 (FIG. 4) becomes smaller than or equal to a predetermined value. In this case, even when functional degradation occurs in a part of the electric brake system, the braking force corresponding to the functional degradation can be compensated for by the whole electric brake system, and moreover, traveling stability of the vehicle can be improved.

The left and right wheels on the front side or the left and right wheels on the rear side may be provided with the electric brake devices while the remaining wheels may be provided with hydraulic brake devices. The host ECU may be a VCU for the vehicle equipped with the electric brake system. The power supply device may be a low-voltage battery or a DC/DC converter connected to a high-voltage battery.

The electric motor 4 may be, for example, a brushless DC motor, or a DC motor using a brush, a slip ring, or the like.

The linear motion mechanism may be a mechanism such as a planetary roller screw, a ball lamp, or the like.

The vehicle may be an electric automobile that drives drive wheels by motors, or a hybrid automobile in which either front wheels or rear wheels are driven by an engine while the other wheels are driven by motors. Alternatively, the vehicle may be an engine vehicle that drives drive wheels by only an engine. The type of the brake may be a disc brake type or a drum brake type.

Although the present invention has been fully described in connection with the preferred embodiments thereof with reference to the accompanying drawings, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . control device
4 . . . electric motor
6 . . . linear motion mechanism (friction member operation mechanism)
8 . . . brake rotor
9 . . . friction member
23 . . . control calculation module (controlled variable error estimation module)
29 . . . controlled variable compensating module
DB . . . electric brake device

What is claimed is:

1. An electric brake system comprising a plurality of electric brake devices,
    each electric brake device including:
        a brake rotor;
        a friction member configured to operatively contact the brake rotor;
        a friction member actuator configured to cause the friction member to contact the brake rotor;
        an electric motor configured to drive the friction member actuator;
        a braking force estimation device configured to determine an estimate of a braking force generated by the friction member being pressed against the brake rotor, the estimated braking force being greater than zero; and
        a control device configured to perform follow-up control of the generated braking force by controlling the electric motor so that the generated braking force matches a braking force target value,
    the electric brake system further comprising:
    a controlled variable error estimation module configured to estimate, for each electric brake device, a controlled variable error that is a difference between the estimate of the braking force determined by the braking force estimation device and a braking force produced by the brake device having no functional degradation; and
    a controlled variable compensating module configured to, when the controlled variable error estimation module estimates the existence of the controlled variable error, distribute a braking force corresponding to the controlled variable error among the electric brake devices other than the electric brake device in which the existence of the controlled variable error is estimated so as to be added to the braking force target values of the respective electric brake devices to perform the follow-up control of the generated braking forces of the electric brake devices other than the electric brake device in which the existence of the controlled variable error is estimated, while continuing to perform the follow-up control of the generated braking force of the electric brake device in which the existence of the controlled variable error is estimated.

2. The electric brake system as claimed in claim 1, further comprising a plurality of diagnosis modules configured to detect functional degradations of the respective electric brake devices, wherein
    the controlled variable error estimation module is configured to estimate a difference between an estimate of a braking force determined by the braking force estimation device of an electric brake device in which functional degradation is detected by the diagnosis module, and an estimate of a braking force determined by the braking force estimation device of an electric brake device in which no functional degradation is detected by the diagnosis module.

3. The electric brake system as claimed in claim 1, wherein
    in order to determine the braking force in the case where no functional degradation occurs, the controlled variable error estimation module uses a state transition formula expressing relationships among:
        a state variable including a motor rotation angle of the electric motor;
        a manipulated variable including voltage or current of the electric motor;
        a state transition matrix including electric actuator inertia of an electric actuator that includes the electric motor and the friction member actuator; and
        a controlled variable including a braking force.

4. The electric brake system as claimed in claim 2, further comprising:
    a main power supply device configured to supply power to each of the control devices of the plurality of electric brake devices and to each of the electric motors of the plurality of electric brake devices; and
    a backup power supply device used when the main power supply device is in an abnormal state, wherein
    the diagnosis module includes a power supply diagnosis section configured to determine whether or not supply of power from the main power supply device is abnormal, and
    the electric brake system further comprises a power supply switching mechanism configured to perform switching of power supply to the backup power supply device when the power supply diagnosis section has determined that supply of power from the main power supply device is abnormal.

5. The electric brake system as claimed in claim 4, further comprising a power limitation unit configured to limit the power supplied to the electric motor, when the power supply switching mechanism performs switching of power supply from the main power supply device to the backup power supply device, wherein
    the estimated controlled variable error is a difference between an estimate of a braking force determined by the braking force estimation device of an electric brake device subjected to power limitation by the power limitation unit and an estimate of a braking force determined by the braking force estimation device of an electric brake device not subjected to power limitation by the power limitation unit.

6. The electric brake system as claimed in claim 1, further comprising a yaw moment calculation module configured to determine a yaw moment that occurs in a vehicle equipped with the electric brake system, wherein
when the controlled variable compensating module adds the distributed braking force corresponding to the controlled variable error to the braking force target value, the controlled variable compensating module determines the braking force to be added so that a yaw moment detected by the yaw moment calculation module becomes smaller than or equal to a predetermined value.

* * * * *